US012560975B2

(12) United States Patent
Saito

(10) Patent No.: US 12,560,975 B2
(45) Date of Patent: Feb. 24, 2026

(54) DISPLAY DEVICE

(71) Applicant: Yoshito Saito, Kanagawa (JP)

(72) Inventor: Yoshito Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 279 days.

(21) Appl. No.: 18/228,676

(22) Filed: Aug. 1, 2023

(65) Prior Publication Data

US 2024/0094780 A1    Mar. 21, 2024

(30) Foreign Application Priority Data

Sep. 13, 2022    (JP) ................................. 2022-145425

(51) Int. Cl.
*G06F 1/16*        (2006.01)
*G06F 1/18*        (2006.01)

(52) U.S. Cl.
CPC ............ *G06F 1/166* (2013.01); *G06F 1/1683* (2013.01); *G06F 1/181* (2013.01); *G06F 2200/1612* (2013.01)

(58) Field of Classification Search
CPC ......................... G06F 1/181; G06F 2200/1612
See application file for complete search history.

(56) References Cited

U.S. PATENT DOCUMENTS

| | | | | | |
|---|---|---|---|---|---|
| 5,329,712 | A | * | 7/1994 | Keller | ........................ G09F 1/10 |
| | | | | | 40/753 |
| 10,690,285 | B2 | * | 6/2020 | Wu | .......................... G06F 1/166 |

| | | | | | |
|---|---|---|---|---|---|
| 2003/0168238 | A1 | * | 9/2003 | Masuda | ................. H02G 11/02 |
| | | | | | 174/72 A |
| 2007/0084621 | A1 | * | 4/2007 | Martin | .................. G06F 1/1603 |
| | | | | | 174/97 |
| 2007/0113458 | A1 | * | 5/2007 | Wang | .................... G06F 1/1601 |
| | | | | | 40/753 |
| 2012/0106043 | A1 | * | 5/2012 | Murakata | ................ G06F 1/166 |
| | | | | | 361/679.01 |
| 2012/0320514 | A1 | | 12/2012 | Franz et al. | |
| 2013/0284513 | A1 | * | 10/2013 | Oh | ........................... H02G 3/00 |
| | | | | | 174/520 |
| 2017/0000250 | A1 | | 1/2017 | Carnevali | |
| 2020/0167013 | A1 | | 5/2020 | Saito | |

(Continued)

FOREIGN PATENT DOCUMENTS

| | | | | | |
|---|---|---|---|---|---|
| CN | 104252204 | A | * | 12/2014 | ............. F16M 11/26 |
| EP | 4242793 | A1 | | 9/2023 | |

(Continued)

OTHER PUBLICATIONS

Machine Translation of CN104252204A (Year: 2025).*

(Continued)

*Primary Examiner* — Allen L Parker
*Assistant Examiner* — Peter Krim
(74) *Attorney, Agent, or Firm* — XSENSUS LLP

(57)        ABSTRACT

A display device includes a housing having a rectangular shape in plan view, a display having a screen surface exposed from a front face of the housing, and a stand disposed on a rear face of the housing and pivotable on a rotation axis at a center in a short-side direction of the housing, to open and close relative to the housing. The stand has a width in a long-side direction of the housing smaller than a width of the housing in the long-side direction.

8 Claims, 12 Drawing Sheets

(56) References Cited

U.S. PATENT DOCUMENTS

| | | | | |
|---|---|---|---|---|
| 2021/0259519 A1* | 8/2021 | Ubbesen | ............... | G06F 1/1626 |
| 2021/0317945 A1* | 10/2021 | Kim | ........................ | G06F 1/181 |
| 2023/0067554 A1 | 3/2023 | Asanuma | | |
| 2023/0280794 A1* | 9/2023 | Iijima | ................... | G06F 1/1635 |
| | | | | 361/679.01 |
| 2024/0184325 A1* | 6/2024 | Wang | ................... | G02F 1/1333 |

FOREIGN PATENT DOCUMENTS

| | | |
|---|---|---|
| JP | 2019-533874 A | 11/2019 |
| WO | 2014/088615 A2 | 6/2014 |
| WO | 2018/069883 A1 | 4/2018 |
| WO | 2021/165366 A1 | 8/2021 |

OTHER PUBLICATIONS

Extended European Search Report mailed Jan. 23, 2024 for European Patent Application No. EP23195784.6, 9 pages.
Office Action issued Mar. 17, 2025 in European Patent Application No. 23 195 784.6, 10 pages.
U.S. Appl. No. 18/155,298, filed Jan. 17, 2023.
Office Action issued Dec. 18, 2025 in corresponding European Patent Application No. 23195784.6 (9 pages).

\* cited by examiner

DISPLAY DEVICE

CROSS-REFERENCE TO RELATED APPLICATIONS

This patent application is based on and claims priority pursuant to 35 U.S.C. § 119(a) to Japanese Patent Application No. 2022-145425, filed on Sep. 13, 2022, in the Japan Patent Office, the entire disclosure of which is hereby incorporated by reference herein.

BACKGROUND

Technical Field

Embodiments of the present disclosure relate to a display device.

Related Art

A known display includes a built-in kickstand that enables the display to be placed in landscape orientation and portrait orientation, for the purpose of increasing the degree of freedom of installation of the display.

SUMMARY

According to an embodiment of the present disclosure, a display device includes a housing having a rectangular shape in plan view, a display having a screen surface exposed from a front face of the housing, and a stand disposed on a rear face of the housing and pivotable on a rotation axis at a center in a short-side direction of the housing, to open and close relative to the housing. The stand has a width in a long-side direction of the housing smaller than a width of the housing in the long-side direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
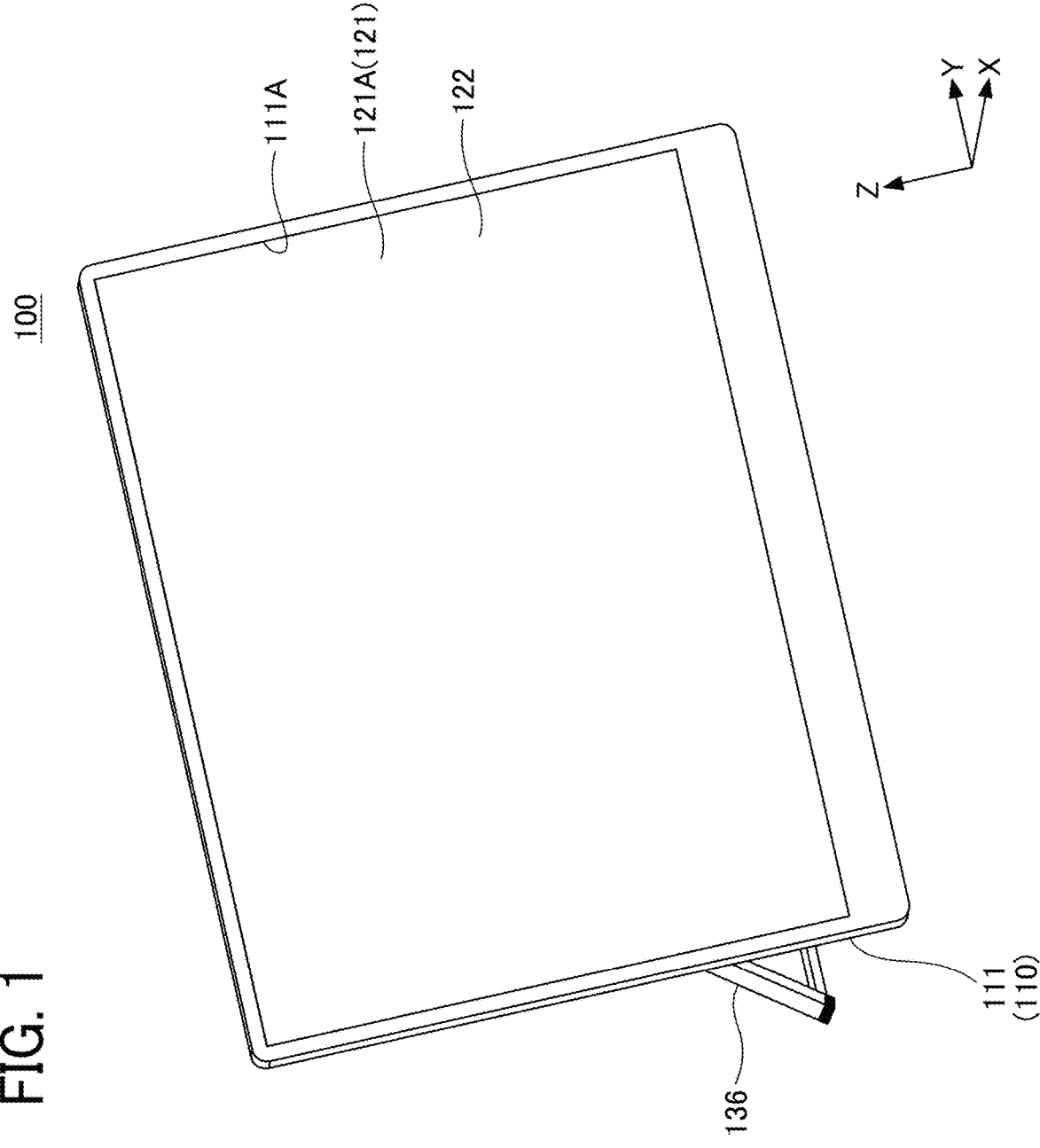
FIG. 1 is an external perspective view of a front side of a display device in landscape orientation, according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Structure of Display Device 100

Figure 2:
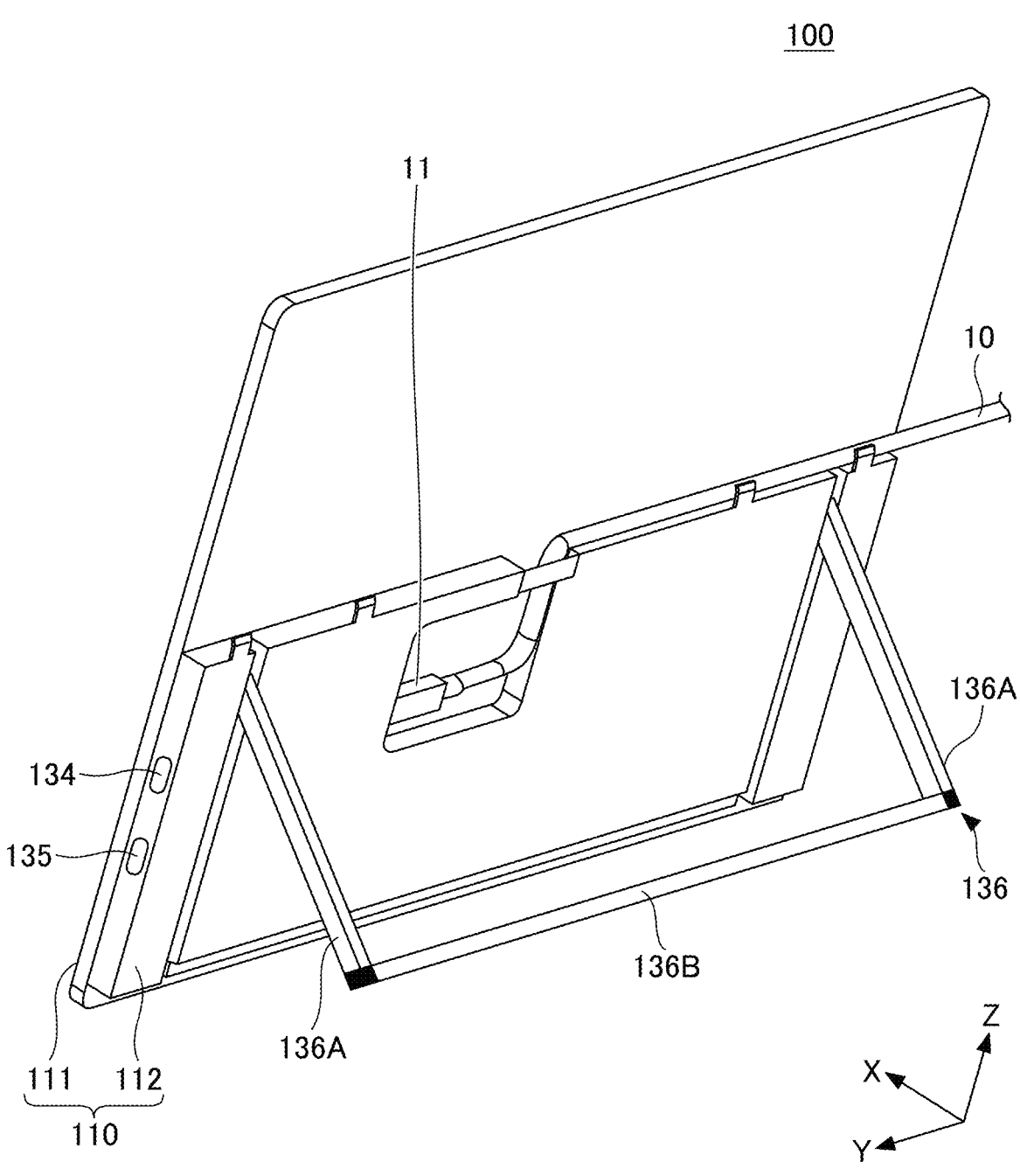
FIG. 2 is an external perspective view of a rear side of the display device in landscape orientation, according to the first embodiment of the present disclosure.

FIG. 1 is an external perspective view of a front side of a display device 100 installed in landscape orientation, according to a first embodiment. FIG. 2 is an external perspective view of a rear side of the display device 100 installed in landscape orientation, according to the first embodiment.

In the following description, the short side direction of a display 121 is referred to as the Z-axis direction (the up-down direction in FIG. 1). The long side direction of the display 121 is referred to as the Y-axis direction (the width direction or lateral direction in FIG. 1). The depth direction of the display 121 is referred to as the X-axis direction (the front-back direction).

In the embodiments of the present disclosure, it is assumed that the direction (Y-axis positive direction) to the left when viewed from the rear side (X-axis negative side) of the display is referred to as the left direction, and the direction (Y-axis negative direction) to the right when viewed from the rear side (X-axis negative side) of the display is referred to as the right direction unless otherwise specified.

In the display device 100 illustrated in FIGS. 1 and 2, a screen 121A of the display 121 is disposed on the front side (face on the X-axis positive side). The display device 100 is connected to an external device (e.g., a laptop personal computer (PC), a smartphone, or an electric power source such as an alternating current (AC) adapter) via a cable 10 and can display various images (moving images or still images) transmitted from the external device via the cable 10 on the screen 121A of the display 121. In other words, the display device 100 is a relatively thin display device having a built-in battery and portable. The display device 100 can be carried together with the external device and connected to the external device at the time of use. In other words, the display device 100 can be used as an extended display of an external device.

As illustrated in FIGS. 1 and 2, the display device 100 includes a housing 110 that defines the outer shape of the display device 100, The housing 110 is made of resin and has a hollow structure. The housing 110 includes a thin portion 111 and a thick portion 112.

The thin portion 111 is a plate-shaped portion on the front side (Z-axis positive side) of the housing 110, The thin portion 111 has a rectangular shape in plan view from the front side (in the X-axis positive direction) or the rear side (in the X-axis negative direction). The thin portion III is relatively thin in the depth direction (X-axis direction), The display 121 is attached to the thin portion 111. The screen 121A of the display 121 is exposed from a rectangular opening 111A formed in a front face (face on the X-axis positive side) of the thin portion 111. The display 121 is, for example, an organic electro-luminescence (EL) display or a liquid crystal display.

In the thin portion 111, a touch sensor 122 is overlaid on the screen 121A of the display 121. The touch sensor 122 receives various input operations, for example, a selection operation and an input by handwriting or hand-drafting. As the touch sensor 122, for example, a capacitive touch panel can be used.

Figures 3A, 3B:
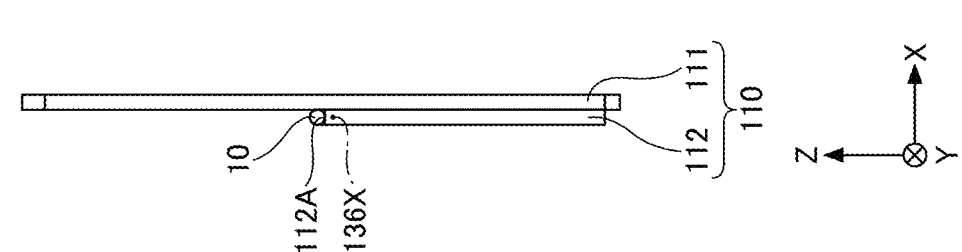
FIG. 3A is a rear view of the display device according to the first embodiment of the present disclosure.
FIG. 3B is a side view of the display device according to the first embodiment of the present disclosure.
Figure 9:
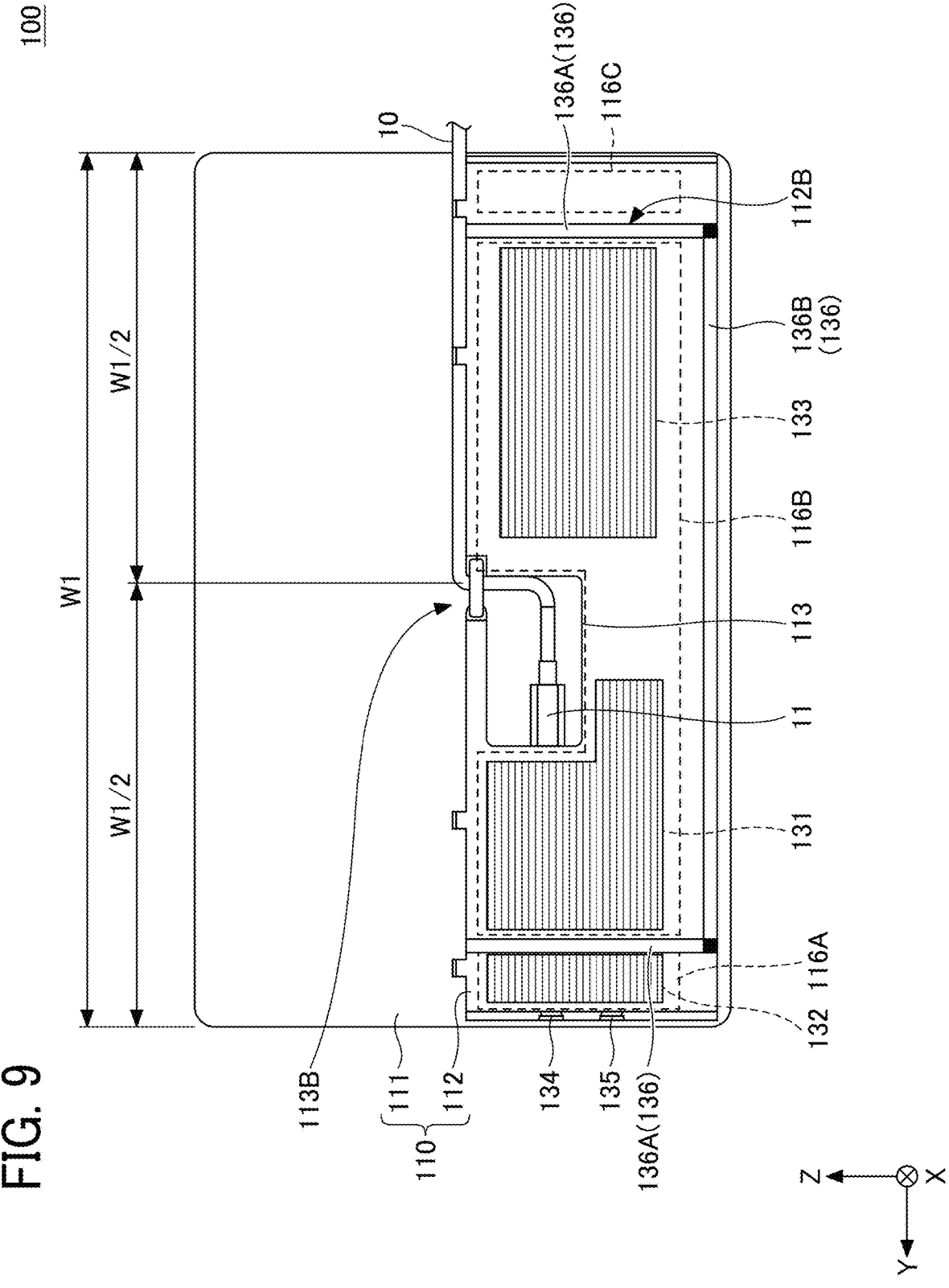
FIG. 9 is a diagram illustrating an internal structure of the display device according to the first embodiment of the present disclosure.

The thick portion 112 is a plate-shaped portion on the rear side (X-axis negative side) of the housing 110, The thick portion 112 protrudes backward from a lower portion of a rear face of the thin portion 111. The thick portion 112 is relatively thick in the depth direction (X-axis direction). The thick portion 112 has a rectangular shape in plan view from the rear side (in the X-axis negative direction). The thick portion 112 has a short-side length and a long-side length such that the thick portion 112 does not protrude from the thin portion 111 in plan view from the rear side (in the X-axis negative direction), As illustrated in FIG. 9, the thick portion 112 contains a main control board 131, an operation board 132, and a battery 133. As illustrated in FIGS. 3A and 3B, interface portions 123 to each of which a connector 11 of the cable 10 is connected are provided on a rear face of the thick portion 112. Further, a stand 136 is provided on the rear face of the thick portion 11

Structure of Rear Face of Display Device 100

FIGS. 3A and 3B are a rear view and a side view, respectively, of the display device 100 according to the first embodiment.

As illustrated in FIG. 3A, a recess 113 is formed in the rear face of the thick portion 112 of the housing 110. The recess 113 is recessed to the front side (in the X-axis positive direction) and has a certain depth.

In the present embodiment described with reference to FIG. 3A, the recess 113 has a rectangular shape in plan view from the rear side, but the shape of the recess 113 is not limited thereto. The recess 113 has a plurality of walls 113A extending in the thickness direction of the thick portion 112 and a bottom 1130 parallel to a direction intersecting the walls 113A.

As illustrated in FIG. 3A, the interface portions 123 are exposed in the recess 113 of the thick portion 112. In the present embodiment described with reference to FIG. 3A, the interface portions 123 are exposed in the recess 113 from the wall 113A on the Y-axis positive side of the recess 113 of the thick portion 112.

Accordingly, in the display device 100 according to the first embodiment illustrated in FIG. 3A, the connector 11 at one end of the cable 10 can be disposed in the recess 113 and connected to the interface portion 123.

In other words, in the display device 100 according to the first embodiment, the connector 11 of the cable 10 can be connected to the interface portion 123 without protruding from the side face of the housing 110.

As a result, the display device 100 and an external device can be disposed next to each other.

Further, since the display device 100 according to the first embodiment can prevent application of a sudden load to the connector 11 of the cable 10, the risk of damaging the interface portion 123 can be reduced.

The cable 10 may be, for example, a universal serial bus (USB) cable or a HIGH-DEFINITION MULTIMEDIA INTERFACE (HDMI) cable. The interface portion 123 has a shape that fits the connector 11 of the cable 10.

The depth of the recess 113 (depth in the X-axis direction) is larger than the thickness of the connector 11 and the outer diameter of the cable 10. Accordingly, in the display device 100 according to the first embodiment, as illustrated in FIG. 3B, the cable 10 (including the connector 11) in the recess 113 can be connected to the interface portion 123 without protruding from the rear face of the thick portion 112 (to the X-axis negative side).

As a result, the display device 100 according to the first embodiment can prevent application of a sudden load to the connector 11 of the cable 10 from the rear side of the thick portion 112.

As illustrated in FIG. 3A, the thick portion 112 includes an outlet 113B through which the cable 10 can be drawn out from the recess 113 above the thick portion 112 (to Z-axis positive side). To be specific, the outlet 113E has a groove shape extending upward (in the Z-axis positive direction) from an upper right corner (Z-axis positive side and Y-axis negative side) of the recess 113 and continuous with a space above the thick portion 112. In other words, the outlet 113B is open in an upper end face 112A of the thick portion 112. The depth of the outlet 113E (in the X-axis direction) is the same as the depth of the recess 113 (in the X-axis direction).

As a result, in the display device 100 according to the first embodiment, the cable 10 can be drawn out, from the recess 113, above the thick portion 112 without protruding from the rear face of the thick portion 112 (to the X-axis negative side).

Further, as illustrated in FIG. 3A, the thick portion 112 includes a holder 114 to hold the cable 10 to the outlet 113B. To be specific, the holder 114 is positioned astride the outlet 113B in the lateral direction (Y-axis direction), and both lateral end portions (in the Y-axis direction) of the holder 114 can be fit to the thick portion 112.

At least one of the lateral end portions of the holder 114 is attachable to and detachable from a fitting hole in the thick portion 112. Accordingly, in the display device 100, when at least one of the lateral end portions of the holder 114 is pulled out from the fitting hole in the thick portion 112, the outlet 113B is opened and the cable 10 can be wired in the outlet 113B. Similarly, in the display device 100, when at least one of the lateral end portions of the holder 114 is fitted into the fitting hole in the thick portion 112, the outlet 113B is closed and the cable 10 can be retained in the outlet 113B.

As a result, in the display device 100 according to the first embodiment, the cable 10 can be retained at the outlet 113B by the holder 114 not to fall off from the outlet 113B. Further, according to the display device 100 of the first embodiment, even when a load (such as being pulled) is applied to the cable 10, the holder 114 can receive the load. As a result, a risk of damaging the interface portion 123 can be reduced.

As illustrated in FIGS. 3A and 3B, the thick portion 112 has the upper end face 112A that guides a cable path along Which the cable 10 drawn out from the outlet 113B is laid. The upper end face 112A serves as a contour along which the cable is laid.

As a result, in the display device 100 according to the first embodiment, the cable 10 drawn out from the outlet 113B can be easily laid along the predetermined cable path.

As illustrated in FIGS. 3A and 3B, the thick portion 112 includes clamps 115 to hold the cable 10 laid along the cable path guided by the upper end face 112A of the thick portion 112.

As a result, the display device 100 according to the first embodiment can hold the cable 10 drawn out from the outlet 113B on the predetermined cable path.

In the present embodiment described with reference to FIG. 3A, the thick portion 112 includes two clamps 115 for each of the cable path of the cable 10 on the right side (Y-axis negative side) of the outlet 113B and the cable path of the cable 10 on the left side (Y-axis positive side) of the outlet 113B.

As a result, in the display device 100 according to the first embodiment, the cable 10 can be held on the cable path by the two clamps 115 in either a case where the cable 10 is drawn out to the left (in the Y-axis positive direction) from the outlet. 113B or a case where the cable 10 is drawn out to the right (in the Y-axis negative direction) from the outlet 113B.

In the present embodiment described with reference to FIG. 3A, on the rear face of the thick portion 112, the interface portion 123 is disposed closer to the left end (the Y-axis positive side) than a center in the lateral direction (Y-axis direction), while the outlet 113B is disposed in a central area in the lateral direction (Y-axis direction).

Accordingly, in the display device 100 according to the first embodiment, the cable connected to the interface portion 123 can be easily bent and drawn out from the outlet 1138 above the thick portion 112 in the Z-axis positive direction. In other words, the cable connected to the interface portion 123 can be easily bent and drawn out from the center area in the lateral direction (Y-axis direction) above the thick portion 112 in the Z-axis positive direction.

Further, in the display device 100 according to the first embodiment, the cable 10 can be drawn out from the outlet 113B to either the left (in the Y-axis positive direction) or the right (in the Y-axis negative direction).

As described above, in the display device 100 according to the first embodiment, the outlet 113B is disposed in the central area in the lateral direction (Y-axis direction). As a result, the length of a portion of the cable 10 guided along the upper end face 112A of the thick portion 112 can be equal between the case where the cable 10 is drawn out to the left (in the Y-axis positive direction) from the outlet 113B and the case where the cable 10 is drawn out to the right (in the Y-axis negative direction) from the outlet 113, In other words, the length of the portion of the cable 10 drawn out from the housing 110 to the outside can be equal. As a result, in the display device 100 according to the first embodiment, the required length of the cable 10 can be constant regardless of whether an external device to be connected to the display device 100 is arranged on the left or the right of the display device 100.

In the present embodiment described with reference to FIG. 3A, the two interface portions 123 are arranged in the up-down direction (Z-axis direction) on the 113A on the Y-axis positive side of the recess 113 of the thick portion 112. Accordingly, in the display device 100 according to the first embodiment, two cables 10 can be connected in the recess 113 so that two external devices are connected to the display device 100 via the two cables 10. In the present embodiment described with reference to FIG. 3A, the outlet 113B has a lateral width larger than twice the outside diameter of the cable 10 such that the two cables 10 can be drawn out side by side.

Further, as illustrated in FIG. 3A, a switch 134 and a switch 135 are provided on the left face (Y-axis positive side) of the thick portion 112. The switch 134 and the switch 135 are, for example, a power button, a selection button, a confirmation button, and a return button.

As illustrated in FIG. 3A, the display device 100 according to the first embodiment further includes a stand 136 that can be stored in the thick portion 112. As illustrated in FIG. 3A, the stand 136 is rotatable about a rotation axis 136X positioned at an upper end of the stand 136.

The stand 136 has a rectangular frame shape. To be more specific, the stand 136 includes a pair of short frame portions 136A (right and left frame portions in the Y-axis direction) and a long frame portion 136B that connects lower ends of the short frame portions 136A. The stand 136 has a rectangular frame shape (so-called U-shape) in which an upper side (between upper ends of the short frame portions 136A) is open.

In the thick portion 112, a storage groove 112B having the same shape as the stand 136 is formed.

As a result, the display device 100 according to the first embodiment can store the stand 136 in the storage groove 112B such that the stand 136 does not protrude from the rear face of the thick portion 112.

Installation of Display Device 100

Figure 4:
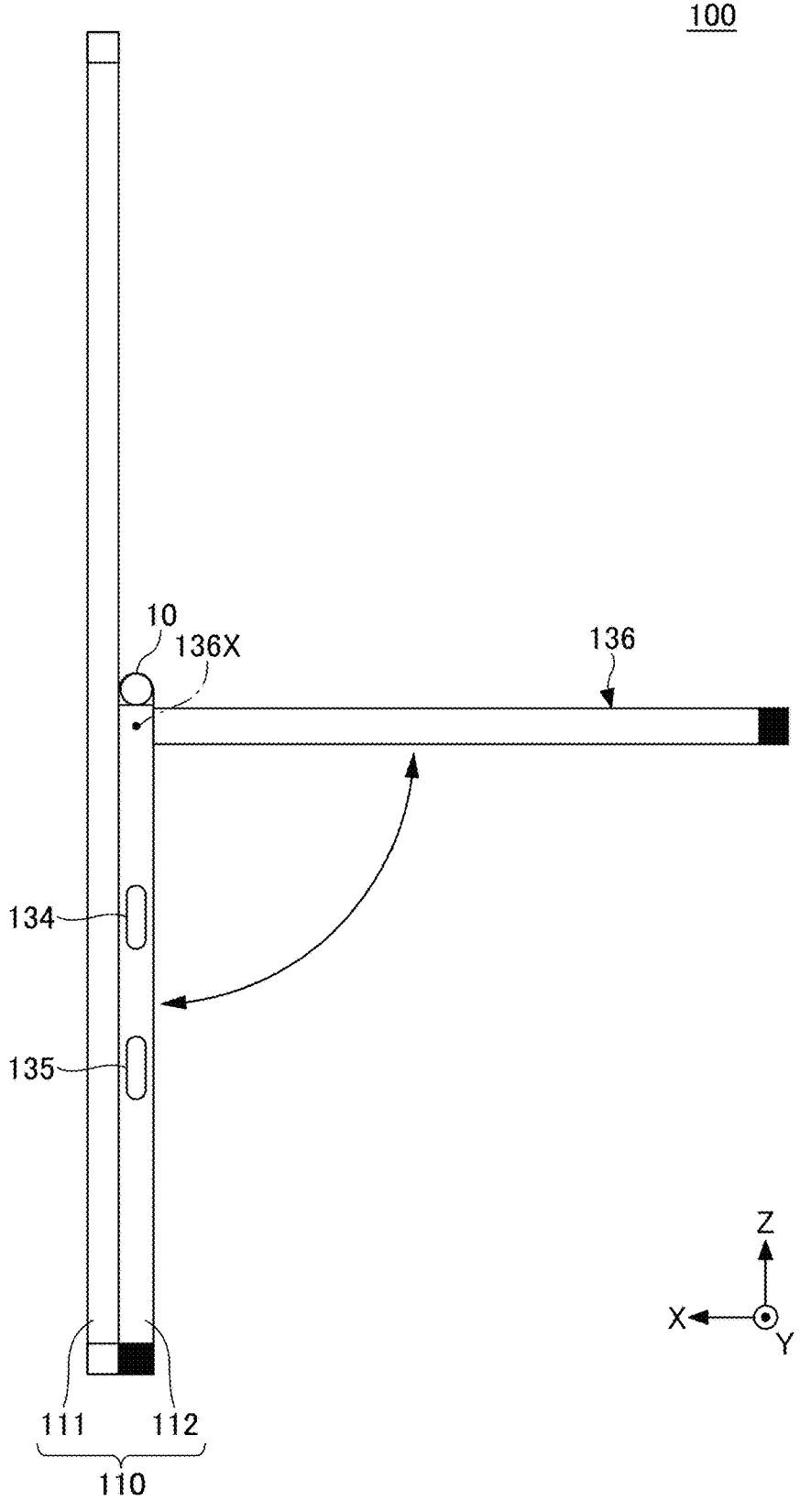
FIG. 4 is a diagram illustrating opening and closing operations of a stand of the display device according to the first embodiment of the present disclosure.
Figure 5:
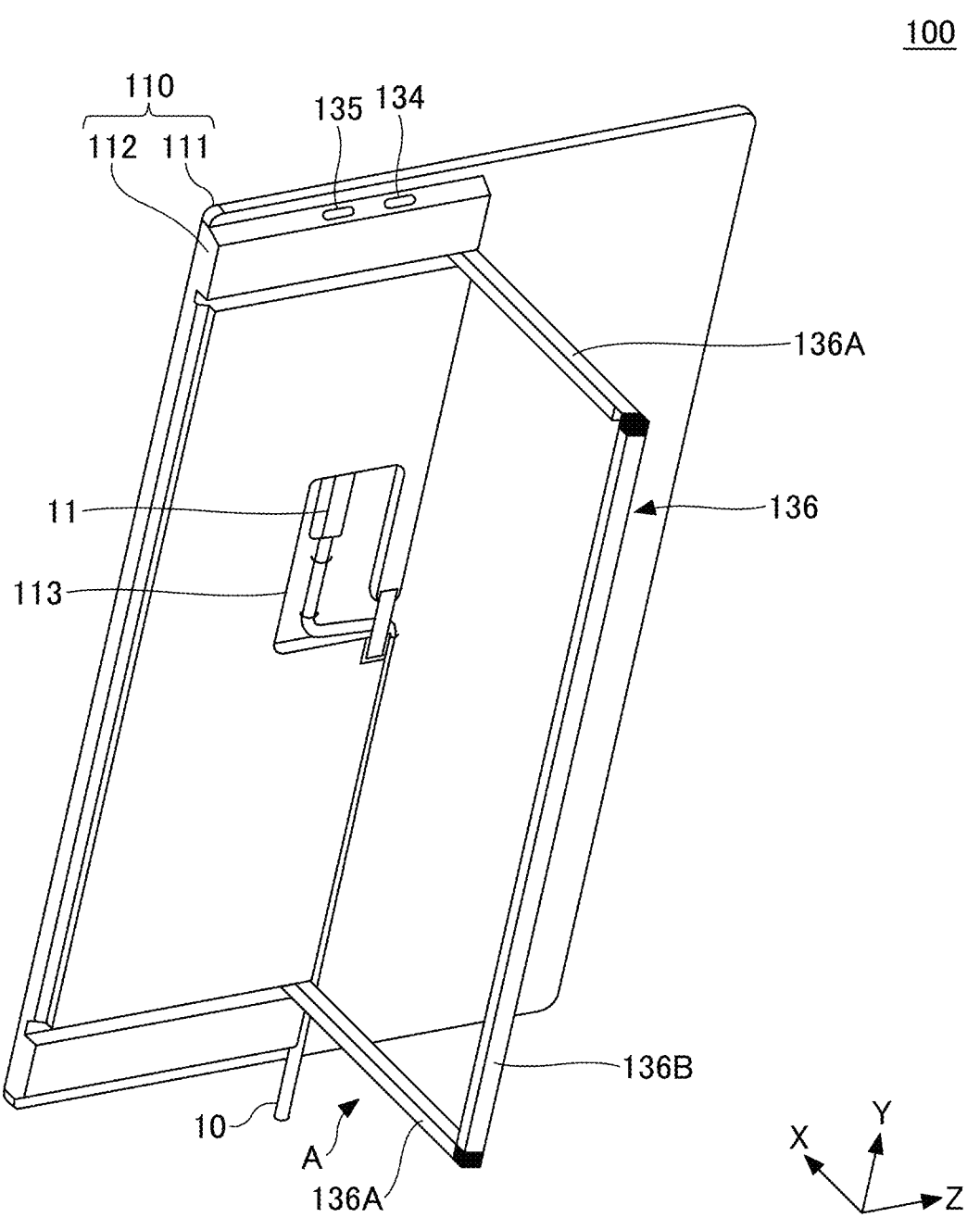
FIG. 5 is a perspective view of the rear side of the display device installed in portrait orientation according to the first embodiment of the present disclosure.

FIG. 4 is a diagram illustrating opening and closing operations of the stand 136 of the display device 100 according to the first embodiment. FIG. 5 is a perspective view of the rear side of the display device 100 installed in portrait orientation according to the first embodiment.

As illustrated in FIG. 4, the stand 136 can rotate about the rotation axis 136X at the upper end of the stand 136, to open and close. The stand 136 can be opened and closed at a desired opening angle. FIG. 4 illustrates the stand 136 opened at an opening angle of 90°, for example.

The opening angle of the stand 136 may be any angle greater than 90°, and the maximum opening angle is 180° in this embodiment.

When the stand 136 is closed such that the opening angle is 0°, the stand 136 can stored in the storage groove 112B in the thick portion 112

Further, the display device 100 according to the first embodiment can be installed in portrait orientation and landscape orientation with respect to the installation surface, and the stand 136 can support the display device 100 in both portrait-orientation installation and landscape orientation installation.

For example, as illustrated in FIGS. 1 and 2, in the display device 100 according to the first embodiment, the housing 110 in landscape orientation (with the long side of the housing 110 faced down in the direction of gravity) can stand on the installation surface when the stand 136 is rotated from the stored position to the opened position. In the display device 100 according to the first embodiment, the opening angle of the stand 136 is adjustable so as to adjust the inclination of the housing 110 relative to the installation surface.

In particular, in the display device 100 according to the first embodiment, the opening angle of the stand 136 is adjustable in a stepless manner. Since the inclination of the housing 110 relative to the installation surface is adjustable in a stepless manner, degree of freedom in the installation of the display device 100 in landscape orientation increases.

The display device 100 according to the first embodiment further includes a known load applying device that applies a constant load to the opening and closing operations. In the display device 100 according to the first embodiment, while the opening angle of the stand 136 is manually adjustable in a stepless manner, applying the constant load can reduce the risk that the stand 136 supporting the display device 100 is unintentionally opened or closed (in other words, the installation angle of the display device 100 is unintentionally changed).

Alternatively, as illustrated in FIG. 5, in the display device 100 according to the first embodiment, the housing 110 in the portrait orientation (with the short side of the housing 110 faced down in the direction of gravity) can stand on the installation surface when the stand 136 is rotated from the stored position to the opened position.

In this case, in the display device 100 according to the first embodiment, by positioning the stand 136 to have the opening angle of 90°, the housing 110 can be stably supported by the stand 136 at the center in the short side direction of the housing 110.

The display device 100 according to the first embodiment may detect the orientation of the housing 110 by a sensor and automatically rotate the orientation of the screen displayed on the display 121 in accordance with the orientation of the housing 110. Alternatively, the display device 100 according to the first embodiment may rotate the screen displayed on the display 121 in accordance with the orientation of the screen set by a user.

Further, as illustrated in FIG. 3, the rotation axis 136X of the stand 136 is positioned below the upper end face 112A of the thick portion 112. Accordingly, in the display device 100 according to the first embodiment, the opening and closing operations of the stand 136 do not interfere with the cable 10 laid along the upper end face 112A of the thick portion 112.

In the display device 100 according to the first embodiment, the connector 11 of the cable 10 can be connected to the interface portion 123 in the recess 113 on the rear face of the thick portion 112. Further, the connector 11 and a part of the cable 10 can be housed in the recess 113.

Accordingly, in the display device 100 according to the first embodiment, when the display device 100 is viewed from the front side, the connector 11 does not protrude from the housing 110 in both of the landscape orientation installation and the portrait-orientation installation. In other words, the connector 11 can be hidden from the user in both of the landscape orientation installation and the portrait-orientation installation.

Further, when the display device 100 according to the first embodiment is installed in landscape orientation as illustrated in FIG. 2, the cable 10 can be drawn out through the outlet 113B (see FIG. 3A) from the thick portion 112 (to the Z-axis positive side) and laid along the upper end face 112A of the thick portion 112.

Alternatively, when the display device 100 according to the first embodiment is installed in portrait orientation as illustrated in FIG. 5, the cable 10 can be drawn out through the outlet 113B (see FIG. 3A) from the thick portion 112 (to the Z-axis positive side) and hung along the upper end face 112A of the thick portion 112. Further, the cable 10 can be laid so as to pass through a triangular clearance A (see FIG. 5) between the short frame portion 136A of the stand 136 and the installation surface.

As described above, in the display device 100 according to the first embodiment, the cable 10 can be laid along the exterior of the display device 100 in both of landscape-orientation installation and portrait-orientation installation. Thus, the routing of the cable 10 can be easy.

In the display device 100 according to the first embodiment, the stand 136 has a rectangular frame shape surrounding the recess 113. With this structure, the stand 136 does not hinder the work of connecting the connector 11 to the interface portion 123 in the recess 113, thus facilitating the work of connecting and laying the cable 10 by the user.

In the display device 100 according to the first embodiment, the stand 136 includes elastic members 137 (see FIG. 6) at a lower left corner and a lower right corner (at the ends in the Y-axis direction on the Z-axis negative side) serving as contact portions with the installation surface. As the elastic members 137, for example, rubber or silicon is used. The elastic members 137 can increase the gripping force of the stand 136 relative to the installation surface in both landscape-orientation installation and portrait-orientation installation, thus increasing the stability of the installed display device 100 according to the first embodiment.

The stand 136 may be provided with the elastic members 137 by any method. For example, the stand 136 may be covered with the elastic members 137. Alternatively, the elastic members 137 may be fixed to the stand 136 or fitted into notches of the stand 136. The elastic member 137 may have any shape such as a tubular shape, a block shape (for example, a cube shape or a ball shape), or a plate shape.

Design Requirements Related to Landscape-Orientation Installation of Display Device 100

Figure 6:
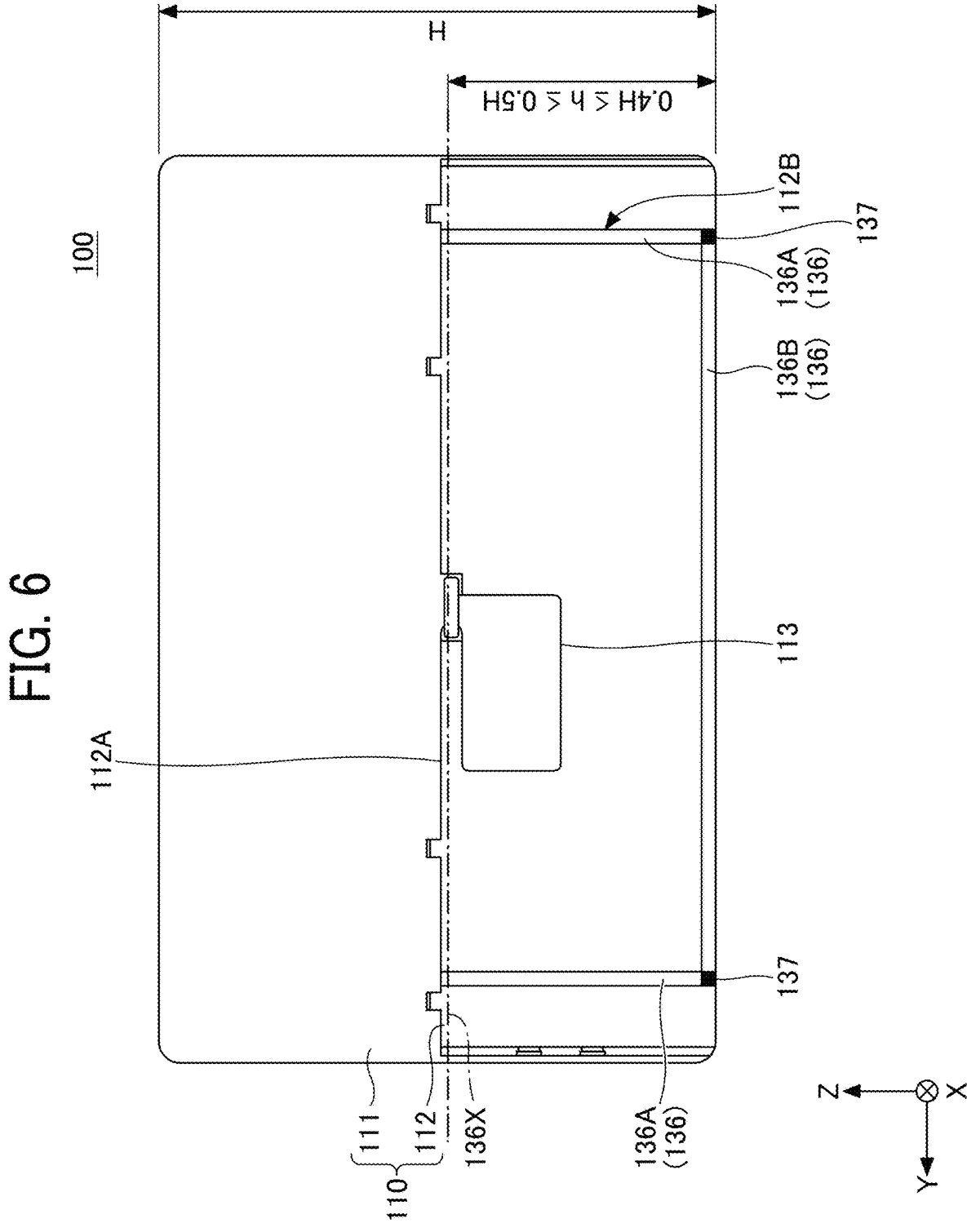
FIG. 6 is a diagram illustrating design requirements related to landscape-orientation installation of the display device according to the first embodiment of the present disclosure.

FIG. 6 is a diagram illustrating design requirements related to the landscape-orientation installation of the display device 100 according to the first embodiment.

As illustrated in FIG. 6, in the display device 100 according to the first embodiment, the stand 136 has the rotation axis 136X at the center in the short-side direction (Z-axis direction) of the housing 110.

With this structure, the display device 100 according to the first embodiment has an increased stability when installed in landscape-orientation as illustrated in FIGS. 1 and 2.

Further, according to the first embodiment, also when the display device 100 is installed in portrait-orientation as illustrated in FIG. 5, the stand 136 is positioned at the center in the short side direction of the housing 110. Thus, the stand 136 can support the housing 110 in a well-balanced manner.

Referring to FIG. 6, in the display device 100 according to the first embodiment, a width h of the stand 136 in the short-side direction (Z-axis direction) is 0.5 times as long as a width H of the housing 110 in the short-side direction (Z-axis direction).

This structure is advantageous in that the long frame portion 136B of the stand 136 can be positioned on the installation surface at a position as far away as possible from the housing 110 to the rear side (in the X-axis negative direction) on the installation surface. Thus, the stability in landscape-orientation installation as illustrated in FIGS. 1 and 2 increases.

However, for example, interference with other components may make it difficult to set the width h of the stand 136 in the short-side direction Z-axis direction) to 0.5 times the width H of the housing 110 in the short-side direction (Z-axis direction). In such a case, when the width h of the stand 136 in the short-side direction (Z-axis direction) is at least 0.4 times the width H of the housing 110 in the short-side direction (Z-axis direction), the stability in landscape-orientation installation can be sufficient.

As described above, in the display device 100 according to the first embodiment, the width h of the stand 136 in the short-side direction (Z-axis direction) is preferably in a range of from 0.4 times to 0.5 times the width H of the housing 110 in the short-side direction (Z-axis direction).

Design Requirements Related to Portrait-Orientation Installation of Display Device 100

Figure 7:
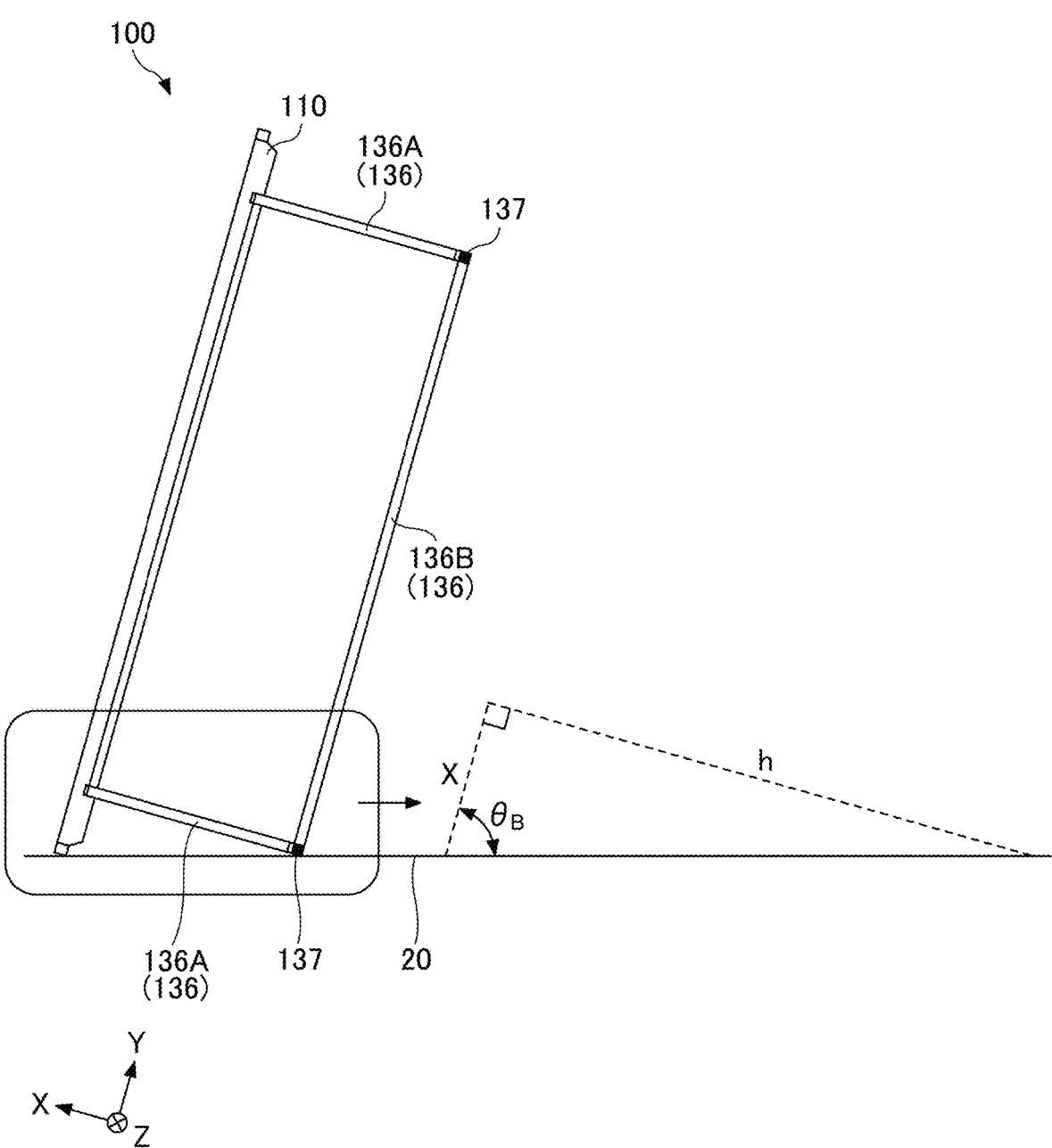
FIG. 7 is a diagram illustrating design requirements related to portrait-orientation installation of the display device according to the first embodiment of the present disclosure.
Figure 8:
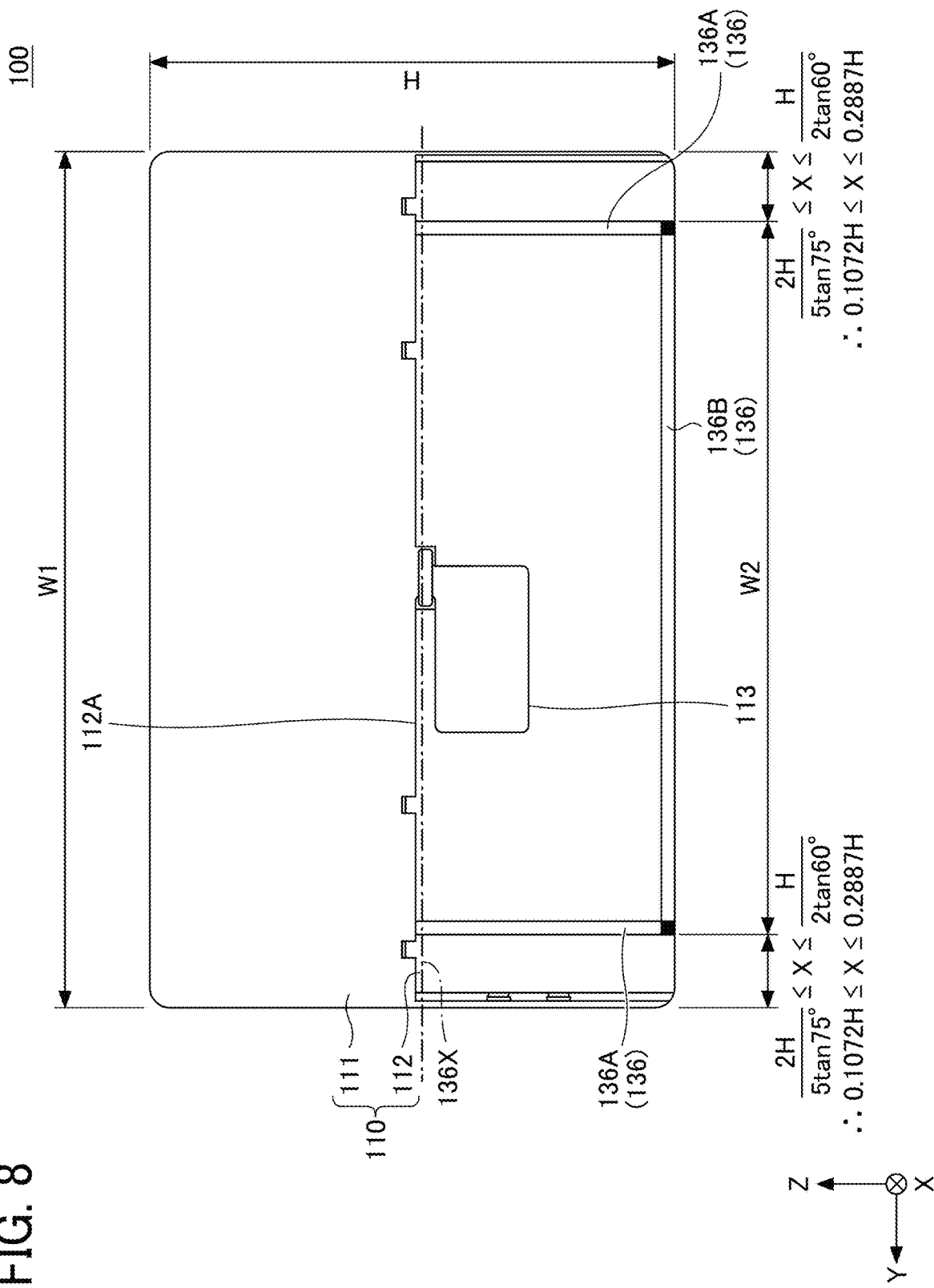
FIG. 8 is another diagram illustrating design requirements related to portrait-orientation installation of the display device according to the first embodiment of the present disclosure.

FIG. 7 and FIG. 8 are diagrams illustrating design requirements related to the portrait-orientation installation of the display device 100 according to the first embodiment.

As illustrated in FIG. 8, a width W2 of the stand 136 in the long-side direction thereof (i.e., lateral direction in FIG. 8) is narrower than a width W1 of the housing 110 in the long-side direction thereof. As a result, as illustrated in FIG. 8, in the display device 100 according to the first embodiment, the end of the housing 110 is at a distance X outward from the end of the stand 136 at each lateral end in FIG. 8.

Generally, an installation angle of a display of, for example, a laptop PC relative to the installation surface is preferably in a range of 60° to 75°.

In a case that the display device 100 according to the first embodiment is installed in portrait orientation as illustrated in FIG. 7, Formulas 1 and 2 below are satisfied when $\theta_B$ represents the installation angle relative to an installation surface 20, X represents the distance from the end of the housing 110 to the end of the stand 136 in the long-side direction of the housing 110 (Y-axis direction), and h represents the width of the stand 136 in the short-side direction. These dimensions are schematically indicated by broken lines in an enlarged manner in a right part of FIG. 7.

$$\tan\theta_B = \frac{h}{X} \qquad \text{Formula 1}$$

$$X = \frac{h}{\tan\theta_B} \qquad \text{Formula 2}$$

The width h in the short-side direction of the stand 136 is expressed by Formula 3 below.

$$\frac{2}{5}H \leqq h \leqq \frac{1}{2}H \qquad \text{Formula 3}$$

Accordingly, in the portrait-orientation installation of the display device 100 according to the first embodiment, the installation angle $\theta_B$ relative to the installation surface 20 can be in the range of 60° to 75°, as illustrated in FIG. 8, when the distance X from the end of the housing 110 to the end of the stand 136 in the long-side direction (Y-axis direction) of the housing 110 satisfies Formula 4 below.

$$\frac{2H}{5 \tan 75°} \leqq X \leqq \frac{H}{2 \tan 60°} \qquad \text{Formula 4}$$

In other words, in the display device 100 according to the first embodiment, the distance X from the end of the housing 110 to the end of the stand 136 in the long-side direction (Y-axis direction) of the housing 110 is preferably in a range of from 0.1072 times to 0.2887 times the width H of the housing 110 in the short-side direction (Z-axis direction).

With this structure, the installation angle of the display device 100 relative to the installation surface 20 can be within the range of 60° to 75° at which the user can easily use the display device 100 in both the landscape-orientation installation and the portrait-orientation installation.

As a result, the installation stability and usability of the display device 100 increase. Further, according to the display device 100 of the first embodiment, incorporating the stand 136 in the housing 110 obviates the need for carrying a stand separate from the housing 110, and the portability of the display device 100 increases.

Internal Structure of Display Device 100

FIG. 9 is a diagram illustrating an internal structure of the display device 100 according to the first embodiment.

As illustrated in FIG. 9, the display device 100 according to the first embodiment includes the outlet 113B in the center area in the lateral direction (Y-axis direction). As a result, the length of the portion of the cable 10 guided along the upper end face 112A of the thick portion 112 can be the half the width W1 of the housing 110 in the long-side direction (W1/2) in both the case where the cable 10 is drawn out to the left (in the Y-axis positive direction) from the outlet 113B and the case where the cable 10 is drawn out to the right (Y-axis negative direction) from the outlet 113B.

Further, as illustrated in FIG. 9, the display device 100 according to the first embodiment includes the main control board 131, the operation board 132, and the battery 133 inside the thick portion 112.

The main control board 131 is connected to the interface portions 123, and various electronic components are mounted on the main control board 131 to construct a control circuit that controls the entire operation of the display device 100.

The operation board 132 is connected to the switch 134 and the switch 135 disposed on the left face (Y-axis positive side) of the thick portion 112, and various electronic components are mounted on the operation board 132 to construct a control circuit that controls the operations of the switch 134 and the switch 135.

The battery 133 stores electric power to drive the display device 100. Various rechargeable secondary batteries (for example, a lithium-ion battery and a lithium polymer battery) are usable as the battery 133, The display device 100 can be supplied with power from an external device via the cable 10 and the interface portion 123 to charge the battery 133.

As illustrated in FIG. 9, in the display device 100 according to the first embodiment, the stand 136 and the storage groove 112B of the thick portion 112 form three internal regions 116A, 116B, and 116C separated from each other inside the thick portion 112.

The internal region 116A is on the left (Y-axis positive side) of the stand 136. Since the operation board 132 is disposed in the internal region 116A, the internal region 116A is effectively used.

The internal region 116B is positioned between the left and right short frame portions 136A of the stand 136. Since the main control board 131 and the battery 133 are disposed in the internal region 116B with the recess 113 interposed therebetween, the internal region 116B is effectively used.

The internal region 116C is on the right (Y-axis negative side) of the stand 136. Although no component is disposed in the internal region 116C in FIG. 9, the internal region 116C may be effectively used for accommodating some component.

Second Embodiment

Figure 10:
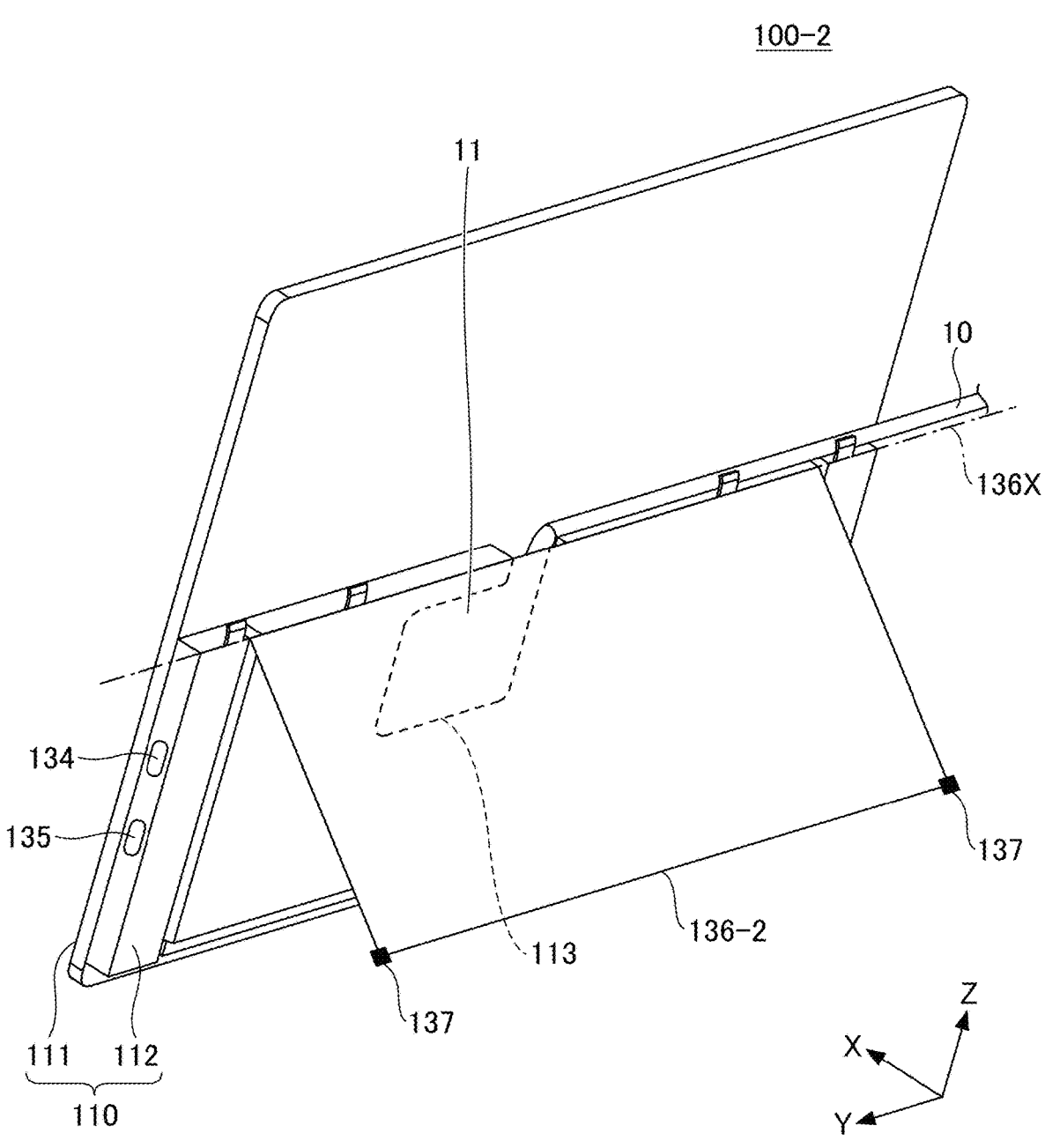
FIG. 10 is an external perspective view of a rear side of a display device installed in landscape orientation, according to a second embodiment of the present disclosure.
Figure 11:
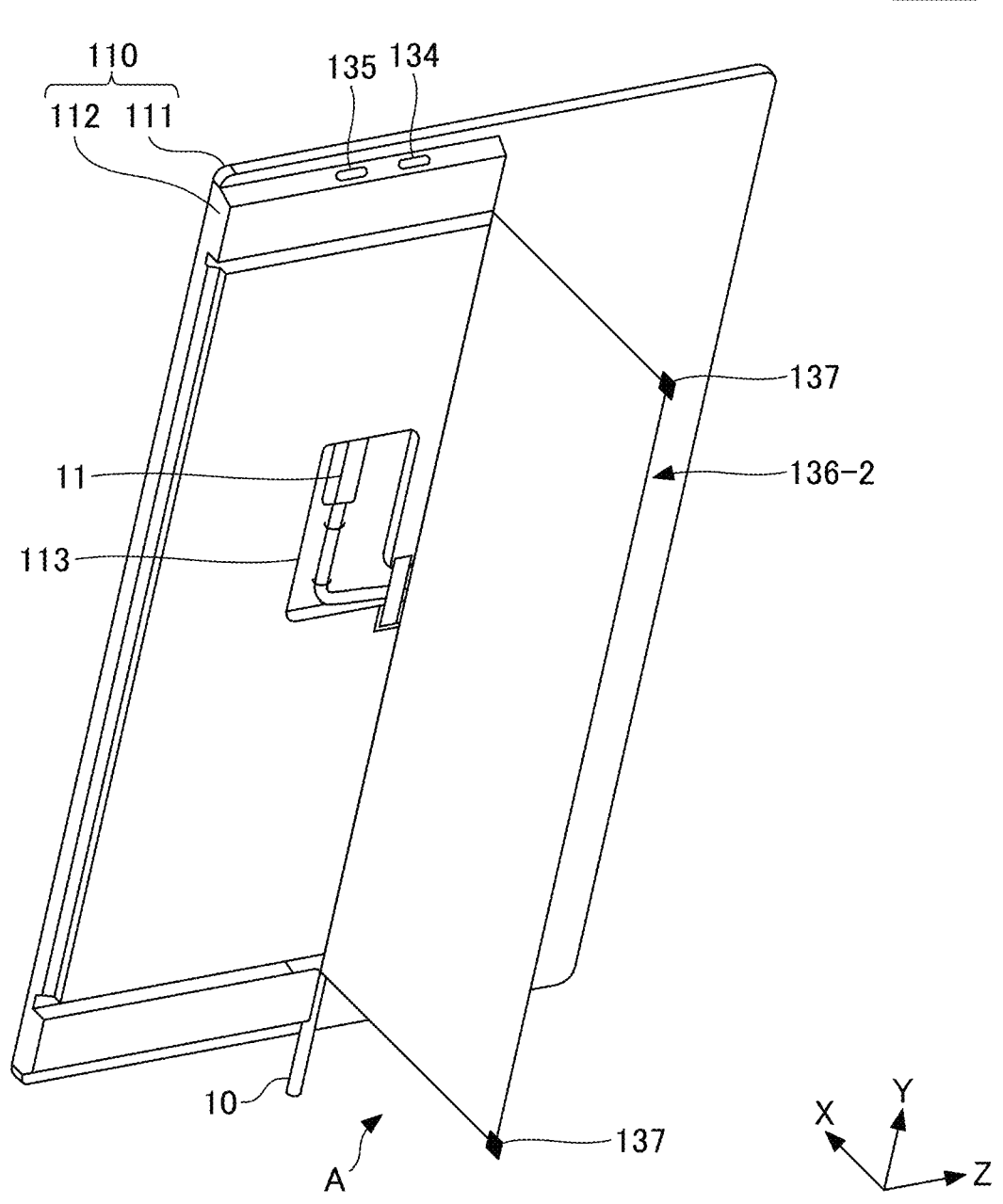
FIG. 11 is an external perspective view of the rear side of the display device installed in portrait orientation, according to the second embodiment of the present disclosure.

FIG. 10 is an external perspective view of a rear side of a display device 100-2 installed in landscape orientation, according to a second embodiment. FIG. 11 is an external perspective view of the rear side of the display device 100-2 installed in portrait orientation, according to the second embodiment.

The display device 100-2 according to the second embodiment is different from the display device 100 according to the first embodiment in that a stand 136-2 is provided instead of the stand 136.

The stand 136-2 is a so-called kick stand and shaped like a flat plate that is rectangular in plan view, differently from the stand 136.

However, the size of the outer shape of the stand 136-2 can be similar to that of the stand. 136 according to the first embodiment. Similar to the stand 136, the stand 136-2 is rotatable about the rotation axis 136X positioned at an upper end of the stand 136-2.

As a result, the stand 136-2 can support the display device 100 in both the landscape-orientation installation and the portrait-orientation installation of the display device 100, similar to the stand 136.

Further, since the stand 136-2 is shaped like a flat plate, the stand 136-2 overlaps with the rear face of the thick portion 112 when stored, thereby covering and hiding the recess 113. Thus, the stand 136-2 enhances the appearance of the rear face of the thick portion 112.

Design Requirements Related to Installation of Display Device 100-2

Figure 12:
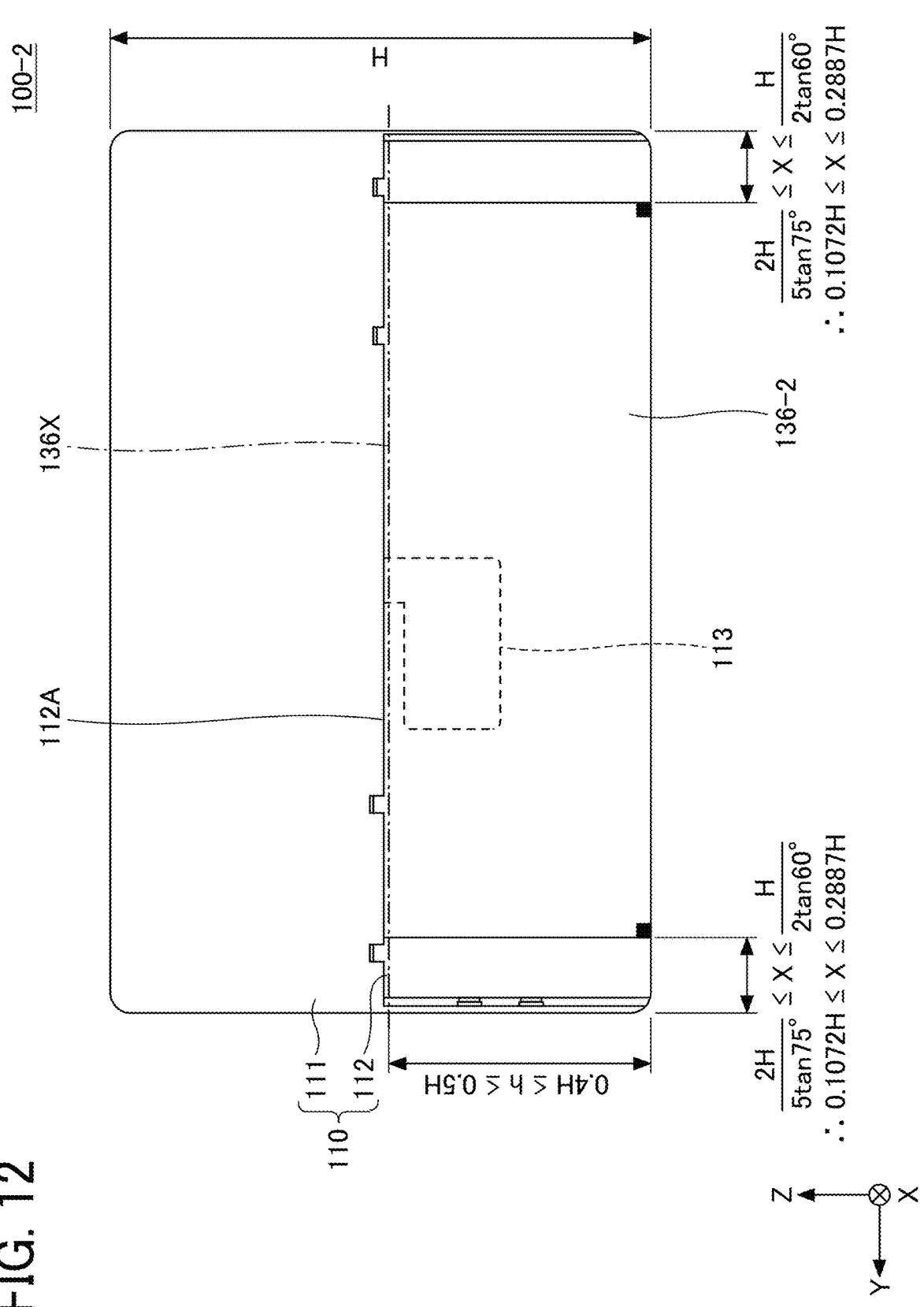
FIG. 12 is a diagram illustrating design requirements related to installation of the display device according to the second embodiment.

FIG. 12 is a diagram illustrating design requirements related to installation of the display device 100-2 according to the second embodiment.

In the display device 100-2 according to the second embodiment, the design requirements related to landscape-orientation installation and the design requirements related to portrait-orientation installation can be similar to those of the display device 100 according to the first embodiment.

For example, as illustrated in FIG. 12, in the display device 100-2 according to the second embodiment, the stand 136-2 has the rotation axis 136X at the center in the short-side direction (Z-axis direction) of the housing 110.

With this structure, the display device 100-2 according to the second embodiment has an increased stability when installed in landscape orientation as illustrated in FIG. 10.

In the display device 100-2 according to the second embodiment, the width h of the stand 136-2 in the short-side direction (Z-axis direction) is 0.5 times the width H of the housing 110 in the short-side direction (Z-axis direction).

In the display device 100-2 according to the second embodiment, the width h of the stand 136-2 in the short-side direction (Z-axis direction) is preferably in the range of from 0.4 times to 0.5 times the width H of the housing 110 in the short-side direction (Z-axis direction).

This structure is advantageous in that a lower long side (contact portion with the installation surface) of the stand 136 (Z-axis negative side in FIG. 12) can be positioned on the installation surface at a position as far away as possible from the housing 110 to the rear side (X-axis negative direction). Thus, the stability in landscape-orientation installation illustrated in FIG. 10 increases.

Further, as illustrated in FIG. 12, in the display device 100-2 according to the second embodiment, the distance X from the end of the housing 110 to the end of the stand 136-2 in the long-side direction (Y-axis direction) of the housing 110 satisfies Formula 4.

In other words, in the display device 100-2 according to the second embodiment, the distance X from the end of the housing 110 to the end of the stand 136-2 in the long-side direction (Y-axis direction) of the housing 110 is preferably in the range of from 0.1072 times to 0.2887 times the width H of the housing 110 in the short-side direction (Z-axis direction).

With this structure, in the display device 100-2 according to the second embodiment, the installation angle relative to the installation surface 20 can be within the range of 60° to 75° at which the user can easily use the display device 100-2 in both the landscape-orientation installation and the portrait-orientation installation.

As a result, according to the display device 100-2 of the second embodiment, the installation stability and usability increase. Further, according to the display device 100-2 of the second embodiment, since the stand 136-2 is incorporated in the housing 110, it is not necessary to carry a stand separate from the housing 110, and the portability of the display device 100-2 increase.

Further, in the display device 100-2 according to the second embodiment, the stand. 136-2 includes the elastic members 137 at the lower left corner and the lower right corner (at the ends in the Y-axis direction on the Z-axis negative side) serving as contact portions with the installation surface. As the elastic members 137, for example, rubber or silicon is used. The elastic member 137 can increase the gripping force of the stand 136-2 relative to the installation surface in both landscape-orientation installation and portrait-orientation installation, thus increasing the stability of the installed display device 100-2 according to the second embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, as described in the embodiments, the aspects of the present disclosure are suitably applicable to a display device including a housing having a thin portion and a thick portion, but the aspects of the present disclosure are also applicable to a display device in which a housing does not have a thin portion and a thick portion (i.e., the housing has a constant thickness).

In addition, for example, as described in the embodiments, the aspects of the present disclosure are suitably applicable to a display device including a housing having a thick portion provided with a recess and interface portions, but the aspects of the present disclosure are also applicable to a display device including a housing having a thick portion not provided with a recess and interface portions.

The invention claimed is:

1. A display device comprising:

a housing having a rectangular shape in plan view;

a display having a screen surface exposed from a front face of the housing; and a stand disposed on a rear face of the housing and pivotable on a rotation axis at a center in a short-side direction of the housing, to open and close relative to the housing, the stand having a width in a long-side direction of the housing smaller than a width of the housing in the long-side direction, wherein the housing includes:

a thin portion provided with the display; and a thick portion disposed on a rear face of the thin portion, the thick portion being thicker than the thin portion, wherein the stand is disposed on a rear face of the thick portion, wherein the stand supports the display device both in landscape-orientation installation relative to an installation surface and in portrait-orientation installation relative to the installation surface, and wherein, in the long-side direction of the housing, a distance from an end of the housing to an end of the stand is in a range of from 0.1072 times to 0.2887 times of a width of the housing in the short-side direction of the housing.

2. The display device according to claim 1, further comprising an interface portion connectable to a connector of a cable for connecting the display device to an external device external to the display device, wherein the thick portion has a recess that accommodates the interface portion therein.

3. The display device according to claim 2, wherein the stand has a width in the short-side direction in a range of from 0.4 times to 0.5 times of the width of the housing in the short-side direction.

4. The display device according to claim 2, wherein the stand has a plate shape, and the stand being closed overlaps with the rear face of the thick portion to cover the recess.

5. The display device according to claim 2, wherein the recess of the thick portion accommodates the connector of the cable connected to the interface portion, and wherein the recess includes an outlet to guide the cable from inside the recess such that the cable is laid along a contour of the thick portion.

6. The display device according to claim 2, wherein the stand has a frame shape, and the stand being closed is positioned outside the recess in the thick portion in plan view.

7. The display device according to claim 1, wherein the stand has a rectangular frame shape and includes a pair of short frame portions and a long frame portion coupling the pair of short frame portions.

8. The display device according to claim 1, wherein the stand includes an elastic member in a contact portion with an installation surface.

* * * * *